Patented Mar. 22, 1938

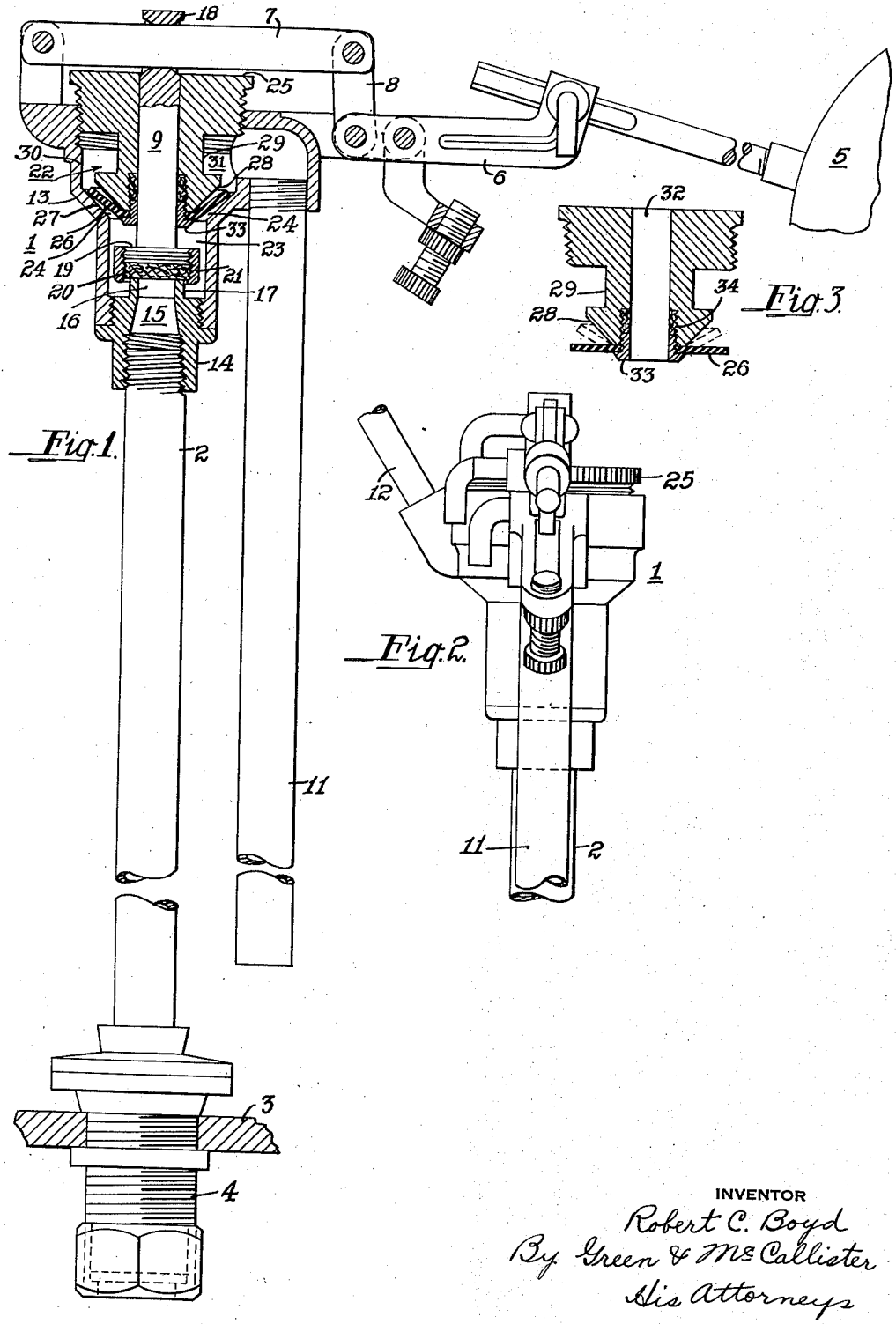

2,111,836

UNITED STATES PATENT OFFICE 2,111,836

BALL COCK

Robert C. Boyd, Louisville, Ky., assignor to Standard Sanitary Manufacturing Company, a corporation of New Jersey Application April 1, 1936, Serial No. 72,099

6 Claims. (Cl. 137—104)

This invention relates to ball cocks for controlling the supply of water to flush tanks for closet bowls, and more particularly to an improvement for eliminating noise in connection with the operation of such ball cocks. Structures of the general character herein referred to have hitherto taken two common forms, viz., a structure in which a flexible membrane fixed as to position is used to put back pressure on the main valve and a structure having controls constructed of inflexible rigid materials. Both these forms of construction have recognized disadvantages. In the former case the time of refilling the tank is unreasonably prolonged at low water pressures, the development of noisy operation increases with increasing water pressures particularly under conditions of high water pressure and the valve construction fails to close at the high water pressures because of the back pressure on the plunger used which is of the usual type having a comparatively large cross-sectional area. In the latter case, due to the use of inflexible rigid materials, the efficiency in reducing noise is materially impaired due to the nature of the materials themselves and the lack of means for obtaining an expanding volume and decreasing velocity effect. The latter type is further objectionable in that due to the non-resilience of the parts it is impossible to obtain a back pressure on the main valve during the entire closing period, thus precluding objectionable closing noise and if the control is sufficiently restricted to prevent noise at high pressures the valve will not close due to back pressure on the usual type of plunger with a relatively large cross-sectional area. The latter type further is relatively ineffective in preventing back siphonage in case a vacuum develops in the water supply line.

An object of this invention is to provide a ball cock having means for silencing the flow of water through it, and which may be adjusted for quiet or noiseless operation over a wide range of water pressures.

Another object of the invention is to provide a silencing device for ball cocks which is self-regulating or self-adjusting according to the velocity of water discharging from the cock so that the device will be effective to silence the cock in wide open position as well as in its near closed position and thereby eliminate the so-called closing noises present in the customary types of so-called noiseless ball cocks. An additional object of my invention resides in a structure of the kind set forth wherein the plunger stem is of relatively small cross-sectional area thus preventing failure of the valve to close under high water pressure conditions.

A further object of the invention resides in a ball cock structure wherein expansion of volume and decrease in velocity of water is secured at the valve seat thereof thus eliminating the operational noises of prior structures.

A further object of the invention is to provide a silencing device for a ball cock that will act also as a check valve to prevent the syphoning of water from the flush tank into the service or supply line in case a vacuum develops in the latter.

Other objects of the invention will be apparent from the following description taken in conjunction with the accompanying drawing, in which:

Figure 1 is a view, in part fragmentary, and partly in section, of a ball cock provided with silencing means embodying one form of the invention;

Fig. 2 is a partial view of the ball cock in side elevation as seen looking from right to left in Fig. 1; and Fig. 3 is a view in section of an adjustable member or support for the silencing means embodied in the ball cock.

Throughout the drawing and the specification, like reference characters indicate like parts.

In Fig. 1 of the drawing, a ball cock 1 is shown which is mounted at the top of a flush water supply pipe 2 located within the flush tank for a closet bowl. The bottom of the pipe 2 is connected through the bottom 3 of the flush tank to a fitting 4 to which the water service or supply line (not shown) is connected. The ball cock is operated in accordance with water level by means of a float 5 connected by a system of levers 6 and 7 and a link 8, lever 7 being connected to a stem 9 of the cock in such fashion as to raise the stem and open the cock when float 5 has descended with falling water level to a predetermined point and to lower the stem and close the cock as the water level rises, the cock coming to its fully closed position when the water level reaches a desired predetermined level which can be regulated by properly adjusting the cock operating mechanism.

When the flush valve (not shown) of the tank is opened, and after the water level in the tank has dropped to a predetermined level, the float and associated lever mechanism open the ball cock and water flows from the supply line up pipe 2 through the ball cock and thence downwardly through a tube 11, usually called a hush tube, and discharges into the tank at the bottom thereof. Water also discharges from the cock through a refill tube 12 for a purpose well understood in this art.

Ball cock 1 comprises a body 13 having at its lower end a fitting 14 which is threaded into the lower end of the body and in which the top of the pipe 2 is threaded. This fitting 14 has a tapered inlet passage 15 therein which terminates in a restricted passage 16 formed by an annular flange 17 that serves as a seat for the ball cock. The cock includes stem 9 having a yoke 18 at its upper end through which lever 7 extends, and an enlarged valve portion at its lower end, comprising a threaded enlarged portion 19 on the lower face of which a valve disc 20 of relatively soft material is secured by means of a ferrule 21 threaded on portion 19.

The diameter of stem 9 is small compared to the diameter of the ferrule 21 so that the difference between the areas of the lower and upper faces or lands of the valve enclosed by the ferrule and exposed to the water pressure will be relatively slight. If the difference between the areas of these faces is small, the valve will always close, whereas if the diameter of stem 9 were large compared to the diameter of ferrule 21, the water pressure acting at the inlet 15 of the valve would prevent closing of the cock. In other words, the diameter of stem 9 should be such that in effect a substantially balanced valve is obtained.

In the ordinary ball cock, the flow of water through the valve is attended with considerable noise because of the high velocity which the water attains in passing through the valve, and the resultant high pressure drop through it. In accordance with this invention this noise is eliminated by providing a silencing device 22 which can be adjusted to regulate the back pressure acting on the valve to a value where the noise is eliminated. This device not only eliminates noise when the velocity of the water through the cock is highest, i. e., when the valve is wide open, but, because of its construction adjusts itself automatically to decreasing velocity of the water through the valve as it approaches its closed position, and remains effective to reduce noise, and particularly that noise which is known as closing noise.

The silencing device 22 is disposed between the outlet of body 13 and the inlet passage and forms with the body a back pressure chamber 23. As may be seen in Fig. 1, the flow area of chamber 23 is large compared to the flow area of passage 16 and that the back pressure in the chamber is dependent largely upon the flow area of the passageway 24, which is adjustable, and formed between the silencing device and the adjacent wall of the body.

The silencing device comprises a plug 25 extending downwardly into the valve body and carrying at its lower end a flexible diaphragm or membrane 26 shaped to cooperate with an annular surface 27 that diverges towards the outlet of the body. This surface is preferably an inverted frusto-conical surface formed at the top of the back pressure chamber 23 and located at a substantial distance above the valve seat 17. The lower end of plug 25 is provided with a surface 28 conforming in shape to surface 27. The plug is provided with a relatively deep groove 29 which together with wall portion 30 of the body forms a chamber 31 from which water flows into the hush tube 11 and the refill tube 12.

In a preferred form of the invention, the plug 25 is designed to serve as the bonnet or cap for the cock body and so is threaded into the top of the same. Plug 25 is provided with a bore 32 to accommodate and guide stem 9. The diaphragm or member 26 is secured to the lower end of the plug by a flanged nut 33 which is threaded into a gland 34 having packing therein to prevent leakage through the plug.

The plug, because of its threaded connection with the cock body, can be adjusted axially of stem 9 to regulate the back pressure acting on valve 19 for any given velocity of flow and pressure of the water supply. The flow passage 24 being adjustable, it is apparent that the velocity of the water can be reduced as desired, but the velocity reduction is not at the expense of volumetric rate of flow as the flow passage 24 gradually increases in area from the back pressure chamber to the discharge chamber formed in part by groove 31 of the plug.

The membrane or diaphragm employed is one having such shape and resiliency that it normally tends to expand towards seat or surface 27. It will therefore respond to water velocity and when the velocity is at its highest, that is, when the cock is wide open, will allow the flow passage 24 to increase, but at the same time give sufficient restriction to reduce noise. As valve 19 approaches closed position, the water velocity decreases but because of the resiliency of the diaphragm, the diaphragm moves towards surface 27 thereby restricting the flow area in response to the reduction in velocity and therefore continues to perform its noise-reducing function and eliminate the so-called closing noise.

It is therefore apparent that for a given setting of plug 25, the diaphragm varies the flow area of passage 24 in accordance with the velocity of the water passing through the cock. The diaphragm therefore is automatic in its regulation of the back pressure in the back pressure chamber 23 and is therefore operative as a silencer throughout the full control range of the cock, i. e. the range between the wide-open and the fully closed positions thereof.

The membrane or diaphragm, as stated heretofore, may be made of a suitable resilient or flexible material such as rubber, rubberized fabric, leather, or any other suitable material which is resilient and flexible, not readily destructible by the action of water thereon, and which will accomplish the intended purpose. This member need not be preshaped to conform to surface 27 adjacent the bottom of the plug as it may be flat as shown in Fig. 3, or it may be preshaped to conform generally to the contour of surface 27, i. e. the membrane may be given a shape indicated by the broken lines in Fig. 3.

When the plug, with its membrane or diaphragm is assembled, the diaphragm will expand and contract with the velocity of the water passing through the cock and in this way silence the cock at all rates of flow through it. Besides acting as a silencer, the diaphragm will also act as a check valve to prevent the syphoning of water from the flush tank into the service line in case a vacuum develops in the latter. If a vacuum occurs in the service line, the diaphragm expands against surface 27 thereby cutting off any syphonic flow that might tend to develop. Even though the diaphragm should become leaky in service, the syphonic flow would still be prevented because the refill tube 12 allows free access of air to chamber 31 directly above the diaphragm.

Having thus described the invention, what is described as new and desired to be secured by Letters Patent is:

1. In a ball cock of the character described, a body having a valve controlled inlet, an outlet, and a back pressure chamber between said inlet and outlet, said body having an annular surface adjacent the outlet, a support disposed within said body and supported for adjustment towards or from said annular surface, a flexible resilient diaphragm secured to said support with its edges lying adjacent said annular surface and extending in the direction of flow through the back pressure chamber, said diaphragm regulating the area of the flow passageway between it and said annular surface in accordance with the velocity of flow to thereby regulate the pressure in the back pressure chamber and render the cock quiet and substantially noiseless in operation.

2. In a ball cock of the character described, a body having a valve controlled inlet, an outlet, a chamber between said inlet and outlet terminating in a frusto-conical surface which diverges towards said outlet, and means cooperating with and having parts shaped similarly to said surface and responsive to the velocity of flow through said chamber for regulating the back pressure in said chamber to thereby minimize and reduce flow noise in said inlet, said back pressure regulating means comprising a plug supported by said body for adjustment towards or from said annular surface and having one end thereof adjacent said surface to provide an annular passage therebetween which increases in area from the outlet of said chamber towards the outlet of said body, and a resilient flexible diaphragm secured to said support and having its edges disposed in said passage and extending towards the outlet thereof.

3. In a ball cock of the character described, a silencing device comprising a plug having a bore extending vertically therethrough, the upper end of the plug being substantially cylindrical and exteriorly threaded and the lower end of the plug being of inverted frusto-conical shape, the plug between the upper cylindrical portion and the lower frusto-conical portion being deeply grooved, and a flexible diaphragm secured to the bottom of said plug.

4. In a ball cock of the character described, a body of generally cylindrical construction the upper portion of which is larger in diameter than the lower portion and the intermediate portion of which is in the form of an inverted frusto-cone, a plug threadedly engaging the upper portion of said body and having a lower end so shaped as to form between it and the frusto-cone an annular passage diverging upwardly, and a flexible member secured to the lower end of the plug and lying within said annular passage, said flexible member being adapted to assume various positions in response to conditions within the body.

5. In a ball cock of the character described, a body of generally cylindrical construction the upper portion of which is larger in diameter than the lower portion and the intermediate portion of which is in the form of an inverted frusto-cone, a plug threadedly engaging the upper portion of said body and having a lower end so shaped as to form between it and the frusto-cone an annular passage diverging upwardly, a flexible member secured to the lower end of the plug and lying within said annular passage, said flexible member being adapted to assume various positions in response to conditions within the body, a stem passing through said plug and terminating in the lower portion of the body, a valve on the lower end of the stem larger in diameter than the stem and a hollow valve-seat-forming member threadedly engaging the lower portion of the body and communicating with a water pipe.

6. In a ball cock of the character described, a body of generally cylindrical construction the upper portion of which is larger in diameter than the lower portion and the intermediate portion of which is in the form of an inverted frusto-cone, a plug threadedly engaging the upper portion of said body and having a lower end so shaped as to form between it and the frusto-cone an annular passage diverging upwardly, a flexible member secured to the lower end of the plug and lying within said annular passage, said flexible member being adapted to assume various positions in response to conditions within the body, a stem passing through said plug and terminating in the lower portion of the body, a valve on the lower end of the stem larger in diameter than the stem and a hollow valve-seat-forming member threadedly engaging the lower portion of the body and communicating with a water pipe and a system of levers for raising and lowering said stem.

ROBERT C. BOYD.